Figure 1:
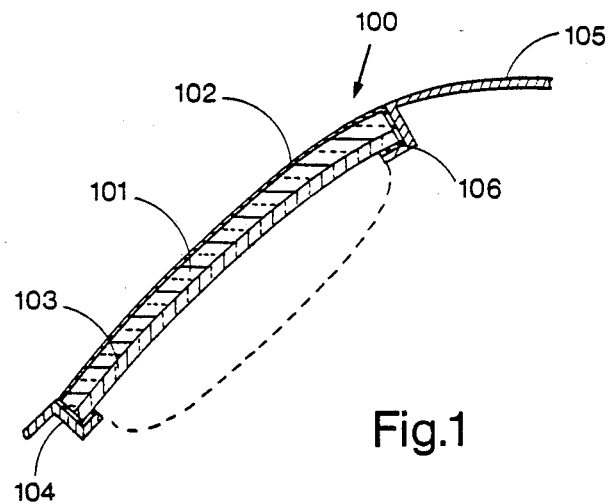

United States Patent [19]

Baudin et al.

[11] Patent Number: 4,910,088

[45] Date of Patent: Mar. 20, 1990

[54] VEHICLE WINDOWS

[75] Inventors: Pol Baudin, Eveque; Jean-François Thomas, Ottignies, both of Belgium

[73] Assignee: Glaverbel, Brussels, Belgium

[21] Appl. No.: 109,272

[22] Filed: Oct. 16, 1987

[30] Foreign Application Priority Data

Oct. 16, 1986 [GB] United Kingdom ............... 8624825

[51] Int. Cl.⁴ .................. B32B 31/20; B32B 1/00; B32B 17/10; B32B 27/06
[52] U.S. Cl. ............................. 428/432; 65/60.52; 427/110
[58] Field of Search ..................... 428/432–434; 427/110; 65/60.52

[56] References Cited

U.S. PATENT DOCUMENTS 4,325,987  4/1982  Kalbskopf et al. ............... 427/110

FOREIGN PATENT DOCUMENTS

| 0086716 | 7/1983 | European Pat. Off. |
| 1475347 | 6/1977 | United Kingdom . |
| 1516032 | 6/1978 | United Kingdom . |
| 2015983 | 3/1979 | United Kingdom . |
| 2004851 | 4/1979 | United Kingdom . |
| 1555081 | 11/1979 | United Kingdom . |
| 2033357 | 5/1980 | United Kingdom . |
| 1598924 | 8/1981 | United Kingdom . |
| 2074090 | 2/1984 | United Kingdom . |

OTHER PUBLICATIONS

Pulker, H. K., Coatings on Glass, Thin Films Sciences and Technology, vol. 6, Elsevien (1984), pp. 335–336.
Norin, F., et al., "Prevention of Frost Formation on Automobile Glazing", SAE Technical Paper Series 870038, Feb. 23–27, 1987, pp. 1–4.

Primary Examiner—Nancy A. B. Swisher
Attorney, Agent, or Firm—Spencer & Frank

[57] ABSTRACT

A vehicle window 100 comprises a glass sheet 101 bearing a coating 102. The coating 102 is a tin oxide coating located on an external face of the vehicle window, and has been polished after deposition.

Such a coating can confer increased abrasion resistance, and facilitates removal of frozen condensation. The coating may be electrically conductive so that it reduces the emissivity of the coated face in respect of infra-red radiation having wavelengths greater than 3 micrometers.

A method of manufacturing a transparent vehicle window is disclosed which comprises depositing a coating on a face of a piece of glass in sheet or ribbon form, the coating deposited being a tin oxide coating. After deposition the coating is subjected to a polishing treatment.

16 Claims, 3 Drawing Sheets

|—0,001mm—|

|—0,001mm—|

VEHICLE WINDOWS

This invention relates to a vehicle window comprising a glass sheet bearing a coating, and to a method of manufacturing a transparent vehicle window which comprises depositing a coating on a face of a piece of glass in sheet or ribbon form. Although the invention is applicable to vehicle windows generally, for example windows of trains, ships or aircraft, the particular problems to be solved by this invention are especially noteworthy in the case of road vehicles, and accordingly the following description of the invention and its advantages will lie mainly in that context.

It is well known that in use, vehicle windows tend to become scratched, whether by the action of windscreen wipers, or by dust or particles of grit which impinge on the vehicle windows as the vehicle is travelling along. A rule of thumb sometimes quoted is that during the lifetime of a road vehicle in which it is incorporated, a windscreen will be subjected to 3,000,000 cycles of wiper action. Thus the problem of window abrasion is particularly acute in relation to the front windows of vehicles. However it is to be noted that dust and grit will in general also impinge on side and rear windows of vehicles, and that the rear windows of many motor cars are also fitted with wipers which can cause further abrasion. Not only is the front window of a vehicle most liable to become abraded in use, but also such abrasion is most troublesome, especially when driving at night, since the presence of such abrasion causes diffusion of light from the headlights of oncoming vehicles and this can dazzle the driver.

It is an object of the present invention to provide a vehicle window which has a high resistance to abrasion. According to the present invention, there is provided a vehicle window comprising a glass sheet bearing a coating, characterised in that said coating is a tin oxide coating located on an external face of the vehicle window, and in that after deposition said coating has been polished.

Tin oxide coatings may comprise an optional doping agent in order to render the coating electrically conductive, and they may also include minor proportions of other compatible materials for various purposes. The nature and amount of any atoms present other than tin and oxygen should not exceed a limit above which the crystal lattice structure type of the coating differs from that of cassiterite.

We have found that the coated face of a vehicle window bearing a tin oxide coating which has been polished in accordance with this invention presents an increased resistance to abrasion. Of course for this advantage to accrue, the coating should be oriented towards the side of the window most at risk of abrasion. Indeed, in one comparative test which has been made, two vehicle windscreens were manufactured, one being a vehicle window bearing a polished coating in accordance with the invention, and the other being uncoated but otherwise substantially identical. The two windscreens were mounted in substantially identical test rigs and were subjected to windscreen wiper action. In the case of the coated windscreen, an increased in abrasion resistance of 60% was noted. By this we mean that after a given time T the uncoated windscreen exhibited a certain degree of abrasion, while the coated windscreen in accordance with this invention did not exhibit the same degree of abrasion before a time $1.6 \times T$.

We have also noted that a vehicle window according to the present invention can present a further and very important advantage.

It is well known that if a road vehicle is left out of doors overnight, its windows are apt to become covered in condensation. This is no real problem in warm weather, since the condensed water droplets usually evaporate shortly after dawn, and they can in any event be removed manually, for example using a squeegee, or by the operation of windscreen wipers, without any difficulty or notable delay. There is however a problem in cold weather if the ambient temperature is low enough to freeze the condensed water. On winter evenings, even a time as short as an hour or two may be sufficient for a layer of ice to build up on a road vehicle windscreen or other window. Obviously such ice must be removed before the vehicle can be driven with adequate visibility to ensure safety. This may be done by manual scraping, perhaps with the assistance of some de-icing spray, or by switching on an electrical resistance heater if such be incorporated in the window, or by heating the whole of the interior of the vehicle, to melt the ice at least at the surface of the window so that it can be removed by wiping as opposed to scraping, for example using windscreen wipers. Of course some combination of these methods could be used. If the driver removes the ice manually he will get cold. The use of many commercially available de-icing sprays tends to lead to smearing of the windows which is particularly inconvenient when driving during the hours of darkness. In any event, the removal of the ice will entail a delay, albeit of only a few minutes, before the vehicle can be driven off safely.

A vehicle window bearing a polished coating in accordance with the present invention presents considerable and surprising advantages over previously known vehicle windows, which do not bear a coating. For testing purposes, a glazing panel according to the present invention has been constituted as a road vehicle windscreen and incorporated in a motor car with the coating facing to the exterior. That car was exposed overnight to a temperature schedule following that of a winter night in which the ambient temperature dropped to below $-10°$ C. A layer of condensation formed on the windscreen and froze. While the temperature was still below freezing, the engine of the car was started, and the windscreen wipers were immediately switched on before any effective heating could take place. Surprisingly, it was found that the windscreen wipers easily swept the layer of frozen condensation from the windscreen to allow clear vision through the swept area. This is not possible with previously known vehicle windscreens, even when the latter are not subjected to such low temperatures. Portions of the windscreen which were not swept by the wiper blades could easily and rapidly be cleared using a squeegee or a gloved hand. Manual clearance of a side window of the same vehicle which was uncoated required the use of a relatively hard scraping implement, with increased risk of causing abrasion, and was relatively time consuming.

The adoption of the present invention thus alleviates the problem of removing frozen atmospheric condensation.

This is not to say that the adoption of the present invention is equally effective in ensuring that, for example, snow which has fallen onto the windscreen, melted, and refrozen will necessarily be cleared so easily. This is partly a problem of the sheer mass of material which has to be removed, and is partly also due to the fact that in such circumstances it often happens that a thick body of ice attaches itself to the windscreen wipers preventing them from flexing to conform to variations in the curvature of the windscreen. Nevertheless, all other things being equal, the adoption of the present invention does make it very much easier to remove ice from a vehicle window.

Advantageously, said coating has a thickness of between 320 nm and 850 nm and preferably between 700 nm and 800 nm. Such coating thicknesses are especially beneficial for promoting a high abrasion resistance without giving rise to objectionable visible light interference effects.

In the most preferred embodiments of the invention, said coating reduces the emissivity of the coated face in respect of infra-red radiation having wavelengths greater than 3 micrometers.

It has been found that this gives advantages in delaying the formation of a layer of ice resulting from condensed water droplets, and in speeding up melting of such ice when the vehicle or its window is heated. This is attributed to the fact that the coated window tends to cool more slowly during cold nights, thus also delaying cooling of the interior of the vehicle.

Advantageously, said coated face has a said emissivity of not more than 0.3 and preferably not more than 0.2. Reducing the emissivity of the coating acts to prolong the delay in cooling through the coated glazing in cold weather when the coating is deposited on the outboard side of the vehicle window as aforesaid. If on the other hand, the coating is deposited on the inboard side of the vehicle window, it will act to prolong the delay in heating through the coated glazing in hot weather, thus for example reducing the tendency for the vehicle to become overheated when it is parked in direct sunlight in the summer.

Preferably, said coating has a resistivity of less than 50 Ohms per square, and optimally a resistivity of less than 20 Ohms per square. The use of a coating having low resistivity has a favourable effect in allowing a high light transmissivity to the panel where this is desired.

In preferred embodiments of the invention, said panel has a luminous transmission of at least 70%. Many countries lay down transmissivity requirements for certain sorts of glazing panels, particularly for road vehicle glazings. For example for lawful use in a particular country, it may be that a motor car windscreen must have a visible light transmissivity of, say, at least 75%, while all other motor car windows must have a visible light transmissivity of, say, at least 70%.

A further general advantage of the invention may be mentioned here. Within the lawful limits, many vehicle drivers prefer that their vehicle windows should have a rather low light transmissivity, for example to reduce glare or to increase the sense of privacy within the vehicle or simply to follow a perceived fashion. To meet this demand, many vehicle manufacturers offer glass windows which are tinted, for example neutrally tinted or grey. Tinted glass is also used for other purposes. To produce tinted glass, including grey glass, the glass manufacturer will require to incorporate colouring agents in the molten glass before it is formed into sheets for glazing panels. This means that the particular glass melting furnace is not available for the production of clear glass while tinted glass is being manufactured and that there will be a period of poor quality production during the change from the production of clear to tinted glass and again when reverting to the production of clear glass. These disadvantages in glass manufacture can be avoided, because it is possible to reproduce the light transmissivity of neutrally tinted glass by applying a said coating to clear glass.

As has been stated, the problems to be solved by this invention are especially noteworthy in the case of road vehicles. In some cases it is useful to install double glazing windows in vehicles e.g. the lateral windows. In such a case the sheet of glass bearing the coating is placed on the external side of the glazing. The safety benefits of using laminated panels for vehicle windows are well known. It is accordingly preferred that said vehicle window comprises a said coated sheet of glass bonded via its non-coated face to at least one further sheet to form a transparent laminate having said coating on an external face thereof. The said further sheet may be a second sheet of glass, or it may be a sheet of plastics material, for example a polycarbonate or a polyurethane.

Windows for installation in vehicles of various sorts are often curved, and are intended to be installed with their convex faces directed outwardly. It is to be noted that it is generally the outboard side of the window which is more at risk from abrasion. It is also to be noted that condensation, and subsequent freezing of that condensation, is more likely to occur on the outwardly directed face of a vehicle window. The invention accordingly includes a said vehicle window which is curved, having one concave face and one convex face, and of which said coating is on said convex face.

The invention also includes a said vehicle window which is installed in a vehicle with its said coated face directed outwardly.

The invention extends to a method of manufacturing a transparent vehicle window which comprises depositing a coating on a face of a piece of glass in sheet or ribbon form, characterised in that there is deposited onto said face a tin oxide coating, and in that after deposition said coating is subjected to a polishing treatment.

This is a very simple and convenient way of manufacturing a glazing vehicle window which has the advantages of affording a high abrasion resistance and of alleviating the problem of removing frozen atmospheric condensation, as hereinbefore specified.

Advantageously, a said coated sheet of glass is bonded via its non-coated face to at least one further sheet to form a transparent laminated vehicle window having said coating on an external face thereof. A laminated vehicle window tends to retain any fragments of glass if it should become broken, and this gives benefits in safety, especially for road vehicle windscreens.

In the most preferred embodiments of the invention, said coating is deposited in such manner that it includes doping ions to render the coating electrically conductive so that it is adapted to reduce the emissivity of the coated face in respect of infra-red radiation having wavelengths greater than 3 micrometers.

Preferably, said tin oxide coating is deposited pyrolytically. Pyrolytic coating techniques are particularly suitable for the deposition of rather thick coatings, and especially when the resulting coating is polished, coatings exhibiting a low diffuse light transmission can be achieved.

In some preferred embodiments of the invention, said tin oxide coating is subjected to a surfacing treatment which includes at least two polishing steps. It has been found that this allows an appropriate choice of materials for use in the different treatment steps, and that this can lead to a more rapid treatment.

Advantageously, in a first polishing step, said coating is rubbed with a discrete abrading material which is harder than said coating. This enables a surface stratum of the coating to be removed quite quickly to leave a surface which can be easily polished to achieve the final desired surface quality.

Preferably, in the last polishing step, said coating is rubbed with a discrete material which is softer and/or of smaller grain size than a discrete material with which the coating is rubbed in the or each preceding polishing step. This promotes a rapid and effective polishing treatment.

The invention extends to a vehicle window made by a method as herein defined and to a vehicle equipped with at least one window as herein defined.

Figure 3:
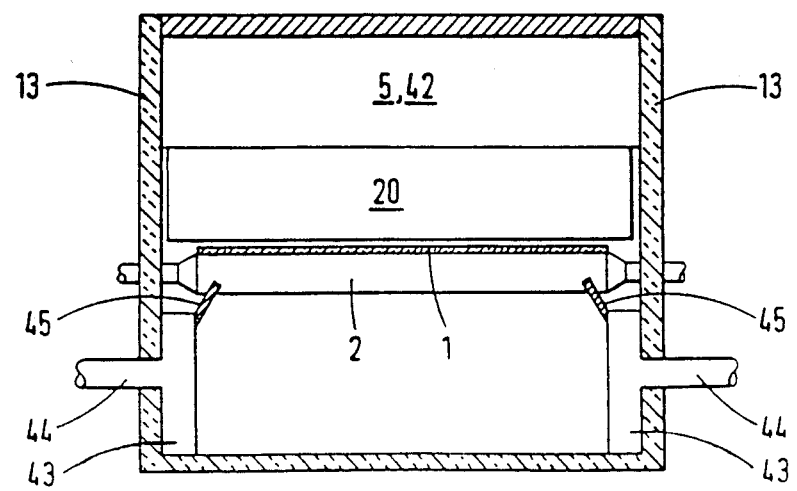
Figure 2:
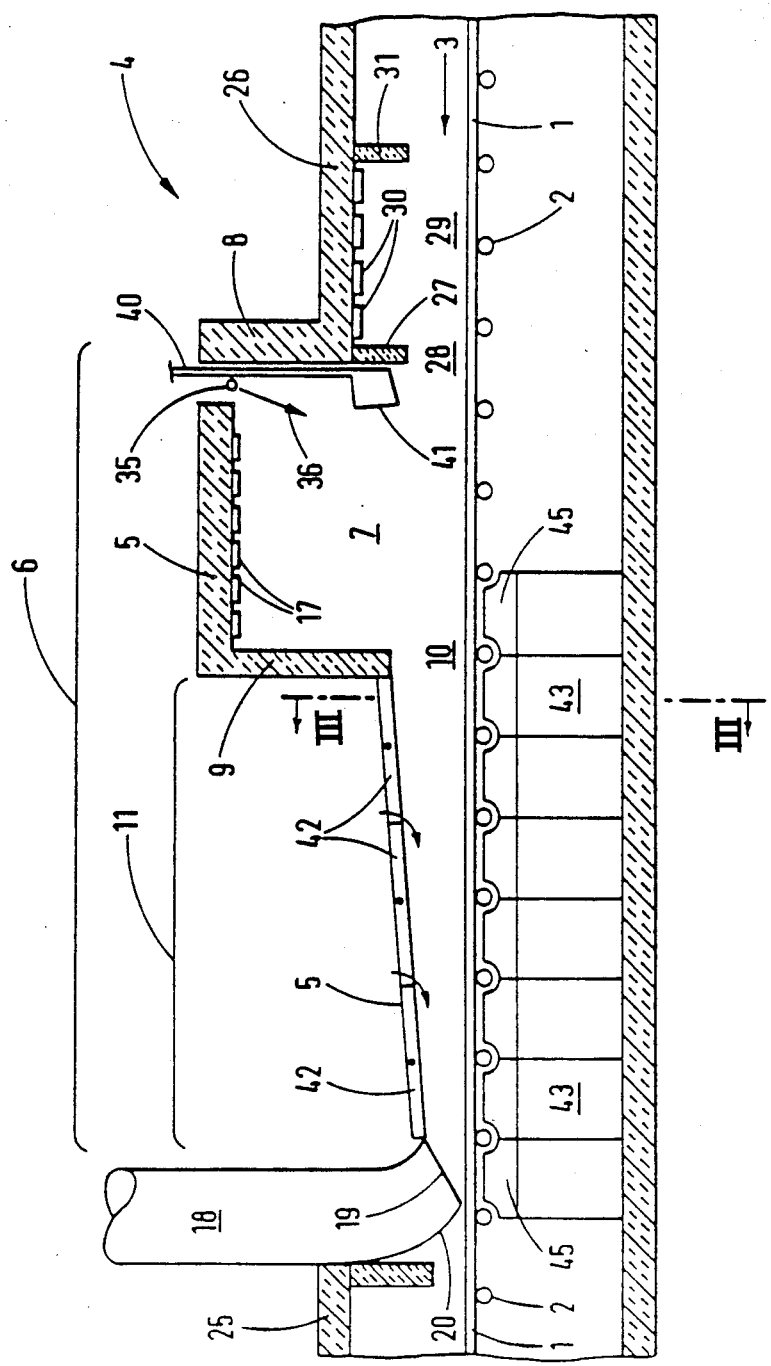
Figure 4:
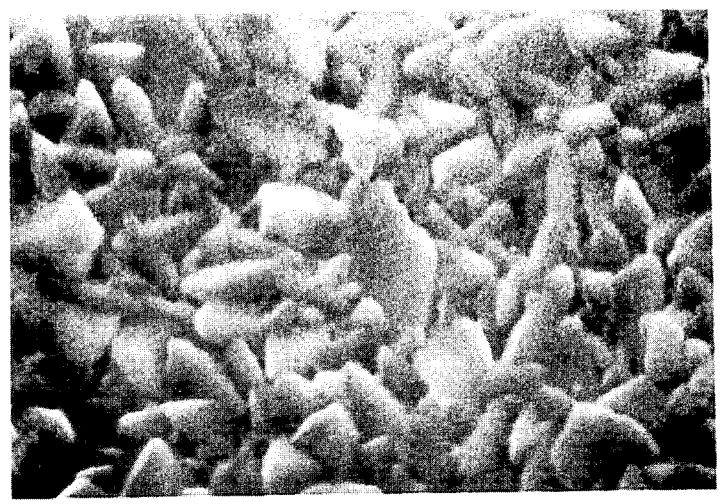
Figure 5:
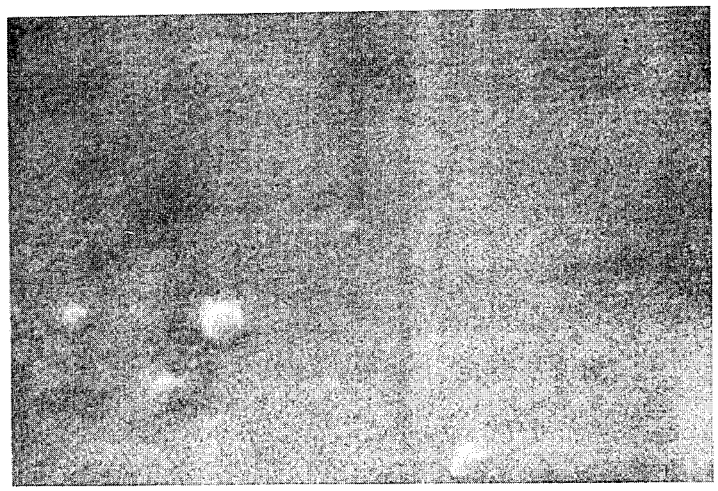

The invention will now be described in greater detail with reference to the accompanying diagrammatic drawings in which:

FIG. 1 is a cross sectional view of a vehicle window according to this invention, FIG. 2 is a cross sectional side view of a coating apparatus for applying a coating to a ribbon of freshly formed hot glass, FIG. 3 is a cross section on the line III—III of FIG. 2, FIG. 4 is an electron-micrograph in plan view of a coating before polishing, and FIG. 5 is an electron-micrograph to the same magnification of the same coating after polishing.

In FIG. 1, a vehicle window generally indicated at 100 comprises a sheet 101 of glass which bears a tin oxide containing coating 102. The uncoated face of the glass sheet 101 is bonded via an adhesive layer (not shown) to a second sheet 103. That second sheet 103 may be a second sheet of glass, or it may be a sheet of a plastics material such as a polycarbonate. The coating 102 of the window panel 100 has been polished.

The window panel 100 is curved so that it has one convex face and one concave face. The coating 102 is on the convex face. The window panel is mounted as a road vehicle windscreen in a recess 104 of a vehicle body 105 and is bonded to the vehicle body by adhesive 106 with the coating 102 on the outside of the vehicle.

Various specific Examples of coated vehicle window panel according to this invention, and a comparative "test" vehicle window panel in which the coating was not polished and is therefore not in accordance with this invention, have the properties given in the following table.

|  | Test | Ex. 1 | Ex. 2 | Ex. 3 | Ex. 4 |
|---|---|---|---|---|---|
| coating thickness (nm) | 900 | 750 | 450 | 750 | 450 |
| coating rugosity (nm) | 50 | 10 | 20 | 35 | 25 |
| I.R. emissivity | 0.25 | 0.11 | 0.19 | 0.14 | 0.20 |
| light transmission (%) | 75 | 75 | 84 | 75 | 84 |

The rugosity of the surfaces of the various coatings was measured by the method set forth in German Standard DIN 4768 Part 1 to give, using the notation of that Standard, a rugosity value $R_z$, over a length $l_t$ of 4.8 mm, taking $Lambda_c = 0.8$ mm. The light transmission for the test panel is calculated in respect of clear glass which is 4 mm thick, and the light transmission values for the window panels of the Examples are calculated in respect of clear glass which is 6 mm thick.

The test panel and the panel of Example 1 were each constituted as a motor car windscreen, and they differed only in the properties of the coating applied and in their curvature, since they were to be installed in different models of vehicle. Those panels were installed as windscreens with their coated faces directed outwardly. The vehicle equipped with the test windscreen was left outdoors during a night in which the ambient temperature dropped to −5° C. The next morning, a layer of frozen condensation covered the windscreen. This layer of ice required to be partially melted before it could be cleared from the windscreen using the windscreen wipers with which the vehicle was equipped. The vehicle equipped with the windscreen according to Example 1 was subjected to overnight cooling according to an ambient temperature schedule which dropped as low as −18° C. The next morning, a layer of frozen condensation covered the windscreen. This layer of ice was slightly thicker than the other, but nonetheless, it could be cleared from the windscreen immediately after starting the vehicle, using the windscreen wipers with which the vehicle was equipped.

In comparison with the test windscreen, an uncoated but otherwise similar windscreen was found to be covered with a slightly thicker layer of ice which also required heating before it could be removed using windscreen wipers alone.

To test abrasion resistance, three similar windscreens were made, one being uncoated, one being coated but unpolished as the "test windscreen" referred to above, and the third being in accordance with Example 1. The windscreens were mounted in test rigs and were subjected to windscreen wiper action. After a time T, it was found that the uncoated windscreen had been abraded to a certain extent. The coated but unpolished "test windscreen" was abraded to the same extent in half that time T. The windscreen of Example 1 was not abraded to that extent until after a time 1.6×T had elapsed, thus demonstrating a 60% increase in abrasion resistance over the uncoated windscreen, and a 220% increase in abrasion resistance over the coated but unpolished windscreen.

The coated and polished windscreens of Examples 2 to 4 also gave very good results in terms both of resistance to abrasion and case of ice removal.

EXAMPLE 5

A tin oxide containing coating was formed by a method as described in Example 1 of BFG GLASSGROUP's British patent specification No. 1 516 032. This specification discloses a process applicable for forming a metal or metal compound coating on a travelling ribbon of hot glass, wherein fluid coating precursor material is discharged onto the ribbon at a mean acute angle of incidence of not more than 60°. The process promotes attainment of a glass-contacting stratum of homogeneous and regular structure.

The coating formed had a thickness of 840 nm, a rugosity of more than 500 nm measured as specified in relation to Examples 1 to 4, and it also had a high haze factor.

As stated in that specification, if the well structured stratum is overlaid by an upper (surface) stratum which is of less regular structure and exhibits certain thickness variations, it can be removed by an after treatment, e.g. by rubbing the coating with a suspension of alumina in distilled water. The treatment proposed in British patent specification No. 1/516 032, while it does reduce haze, has been found to be incapable of reducing the coating rugosity sufficiently to permit good abrasion resistance or easy removal of a layer of ice or of bringing the light-diffusing power of the coating to a sufficiently low value to meet some market demands, for example for use as vehicle windows.

The coated sheet was conveyed through an abrading station where the coating was subjected to an abrading treatment to remove a surface stratum thereof as follows:

The coating was abraded by an abrading medium consisting of alpha alumina (Moh hardness 9.0) having a mean grain size of 1 micron and forming agglomerates of various sizes up to about 45 microns in size. The alumina was mixed with water in equal proportions by weight and the resulting suspension was supplied to foam pads which were used to polish the coating. At the end of this treatment the coated sheet was rinsed and dried and the surface rugosity of the coating was found to be about 100 nm when measured in the manner specified. The thickness of the remaining coating was 750 nm.

Accordingly, in a second stage, the coating was subjected to a polishing treatment, in which the coating was polished by a medium consisting of gamma-alumina (Moh hardness 8.0) having a mean grain size of 0.1 micron. The alumina was applied to the wet coating and was rubbed over the coating by an identical battery of foam pads. At the end of this second stage treatment the coated sheet was rinsed and dried. The surface rugosity of the coating was about 35 nm. Other properties of the coated glass were as follows:

| I.R. emissivity | 0.14 |
|---|---|
| light transmission (%) | 75 (for 5 mm glass) |

In order further to reduce the rugosity of the coating, it was then subjected to a third stage polishing treatment in which the coating was wetted with water and was polished by means of pumice (Moh hardness between 5 and 6). The pumice was applied in dry state to a battery of foam pads identical to those used in the first two stages of the treatment. At the end of this polishing treatment the coated sheet was rinsed and dried. The light-diffusing power (haze) of the polished coating was very low. The surface rugosity of the coating was about 10 nm. Other properties of the coated glass were substantially unchanged.

The abrasion resistance of the resulting coating was very similar to that of the coating of Example 1, as was the ease with which ice could be removed therefrom.

FIGS. 2 and 3

In FIGS. 2 and 3, apparatus for pyrolytically forming a metal compound coating on an upper face of a heated glass substrate 1 in sheet or ribbon form comprises conveyor means such as rollers 2 for conveying a substrate in a downstream direction 3 along a path also indicated by reference numeral 1. The path 1 leads through a coating station 4 comprising a roof structure 5 defining a coating chamber 6 opening downwardly onto the substrate path 1. The roof structure 5 defines an elevated upstream zone 7 of the coating chamber 6 having an upstream end wall 8 and terminating in a vertical bridge wall 9 at its downstream end beneath which an exit slot 10 gives vapour flow communication with a passageway 11 which is formed as a downstream continuation of the upstream zone 7 of lesser height, and which gives the coating chamber a total length of at least 2 meters, and preferably at least 5 meters.

Means is provided for discharging coating precursor material and oxidising gas into the upstream zone 7 of the coating chamber 6 and for subjecting such material to mixing forces so that they become mixed within the upstream zone 7.

At the downstream end of the passageway 11, atmospheric material is aspirated into exhaust ducting 18 having an inlet 19 defined in part by a curved exhaust scoop 20. The scoop extends above the path of the substrate 1 across the full width of the passageway, and substantially closes its downstream end. This substantially prevents the flow of atmospheric material into or out of the coating chamber 6 at the downstream end of the passageway 11. The scoop 20 may optionally be mounted pivotally so that it can be adjusted for minimum clearance with the substrate 1.

The coating station 4 is located between the exit from a ribbon forming plant (not shown), for example a float tank, and the entrance to an annealing lehr 25.

A passage leading from the ribbon forming plant to the coating chamber 6 has a roof 26 from which depends a screening wall 27 at the upstream end of the coating chamber 6, to allow clearance for the substrate 1 to pass into the coating chamber via an entry slot 28.

The effect of this screening wall 27 is to limit the flow of atmospheric material into the coating chamber 6 from the upstream direction, so that atmospheric conditions within that chamber can more easily be controlled.

Upstream of the screening wall 27 there is an antechamber 29 in which heating means 30 are provided. Such heating means may be radiant heating means, for example a finned radiator, or it may comprise one or more burners. A second screening wall 31 is provided above the substrate path at the upstream end of the antechamber 29.

In operation, a semi-natural current of gas will be drawn into the upstream end of the coating chamber 6 from the antechamber 29 so that the gaseous environment in the immediate vicinity of the upper face of the substrate 1 at least in the zone at which coating formation commences, may be controlled by preheated gas fed in the downstream direction 3 into the chamber 6 to enter the chamber in contact with the substrate 1 and form a blanket layer which covers the substrate at least as far as the zone of contact with the coating precursor material.

The downstream flow from the mixing zone 7 is throttled downwardly by the bridge wall 9 over the exit slot 10, so that coating precursor vapours are constrained to flow in contact with the substrate, and during such contact a coating is pyrolytically formed on the glass.

The coating precursor discharge means comprises a spray nozzle diagrammatically represented at 35 for spraying a stream of coating precursor solution into the mixing zone 7 of the coating chamber 6. The discharge axis of the spray nozzle 35 is indicated at 36, and this leads in the downstream direction 3, downwardly towards the substrate 1.

In the embodiment illustrated, the spray nozzle 35 is located to spray coating precursor material from a height of at least 60 cm above the substrate path 1 and it is of a type well known per se. In other embodiments, such discharge height may be in excess of 75 cm and it is preferably at least 1.2 meters. The nozzle is movable to and fro along a track (not shown) across the width of the substrate path. The reciprocating movement of the nozzle 35 and the consequent movement of the discharged material create substantial turbulence within the upper part of the mixing zone 7, so promoting intimate mixing of the vaporised precursor material and the hot air.

In the mixing zone 7 at the upstream end of the coating chamber 6, gas discharge ducting 40 has a discharge orifice 41 which is directed towards the upstream side of the sprayed stream of coating precursor material. The discharge orifice 41 has a lesser width than the coating chamber 6, and it is moved to and fro across the spraying zone in tandem with the spray nozzle 35. In a variant, the discharge orifice 41 extends across almost the full width of the coating chamber 6.

The discharged air may be preheated, for example by burners or by a heat exchanger (not shown), for example to a mean temperature in the range 300° C. to 500° C. The effect is that a reservoir of atmosphere richly laden and well mixed with coating precursor vapour is maintained in the mixing zone 7.

The roof structure over the passageway 11 is formed by a plurality of louvres 42 which are pivotally openable so that preheated air can be caused to flow into the passageway and along its roof to augment the temperature there and to inhibit coating deposition or condensation on that roof.

Along the length of that passageway 11, exhaust means is provided at each side of the coating chamber beneath the level of the substrate path 1. This exhaust means comprises a plurality of open-topped exhaust boxes 43 communicating with exhaust ducts 44. From FIG. 2 it will be noted that these exhaust boxes 43 extend over the full length of the substrate path occupied by the passageway, and that the upstream exhaust box is in fact located beneath the mixing zone. Baffles 45 project upwardly and inwardly from the exhaust boxes to extend beneath the margins of the substrate path and between the conveyor rollers 2. This arrangement provides an effective separation of the atmospheres vertically above and vertically below the substrate path along the passageway.

To compensate for the progressive reduction of atmospheric material travelling along the passageway due to this side aspiration, the roof structure 5 descends towards the substrate 1 in the downstream direction 3 along the passageway.

EXAMPLE 6

The apparatus of FIGS. 2 and 3 was used to form a doped tin oxide coating on a 3 m wide ribbon of 6 mm float glass travelling at 8.5 m/min, and entering the coating chamber with a temperature of 600° C. The coating chamber had a total length of 8 meters. An aqueous solution of stannous chloride containing ammonium bifluoride was discharged at a rate of about 220 L/h at a pressure of 25 bar from a height of 1.8 m above the glass using a spray nozzle inclined in the downstream direction at an angle of 50° to the horizontal and which was reciprocated across the ribbon path at a rate of 23 cycles per minute.

The total amount of atmospheric material aspirated through the exhaust ducting 18 and 44 was about 100,000 m3/h at a temperature of about 300° to 350° C.

Hot air was blown into the mixing zone 7 through the discharge orifice 41 ganged to the spray nozzle, at a temperature of 600° C. and at a rate of about 5000 m3/h. Radiant roof heaters 17 helped to ensure evaporation of the great majority of the coating precursor material and solvent before contact with the glass. Preheated air was drawn into the coating chamber 6 from the upstream antechamber 29 to contribute to the atmospheric material aspirated. In a variant, preheated air was blown positively into the antechamber 29.

In another variant, the discharge orifice 41 extended the full with of the coating chamber, and it was used for the discharge of air heated to 600° C. at a rate of 25,000 m3/h.

In the result, the coating formed had a high quality uniform structure and thickness over the full width of the ribbon and hence good optical qualities. The inclusion of coating reaction products which would lead to defects was substantially avoided.

The coating formed had a thickness of 750 nm, and a rugosity of 30 nm measured as previously specified. FIG. 4 is an electron-micrograph to a magnification of approximately 50,000 times, as indicated, of that coating.

The coated glass was conveyed through a polishing station where the coating was subjected to a rugosity reducing treatment which consisted simply of the second treatment step of Example 5.

At the end of the treatment the coated glass was rinsed and dried. The light-diffusing power (haze) of the polished coating was very low. The rugosity was reduced to 10 nm. The smoothness of the coating will be apparent from the lack of detail in FIG. 5 which is an electron-micrograph to the same magnification as FIG. 4 of that coating after polishing. Other properties of the coated glass were as follows:

| | |
|---|---|
| I.R. emissivity | 0.12 |
| light transmission (%) | 75 |

The abrasion resistance of the resulting coating was very similar to that of the coating of Example 1, as was the ease with which ice could be removed therefrom.

EXAMPLE 7

Example 6 was repeated for forming a tin oxide coating on a ribbon of floating glass 4 mm in thickness. In this Example, the spraying and aspiration rates were adjusted for forming the coating to a thickness of between 450 and 480 nanometers. The thus formed coating was then conveyed through a polishing station where the coating was subjected to a rugosity reducing treatment which again consisted simply of the second treatment step of Example 5. At the end of this treatment the rugosity of the coating was found to be rather less than 15 nm, and its emissivity in respect of long wavelength infra-red radiation was between 0.15 and 0.18.

The coated ribbon was cut into sheets and these were curved, in a manner known per se, for use as vehicle windscreens. Each curved coated sheet had its coating on its convex face, and its concave face was assembled to a similarly curved float glass sheet 1.8 mm in thickness with an intervening layer of polyvinyl butyral 0.76 mm in thickness, and the assembly was then bonded together to form a laminated windscreen.

The visible light transmissivity of the windscreen was found to be 77%.

The light-diffusing power (haze) of the polished coating of the resulting windscreen was very low. The abrasion resistance of the coating was very similar to that of the coating of Example 1, as was the ease with which ice could be removed therefrom.

EXAMPLE 8

In a variant of Example 7, the uncoated concave face of a 4 mm sheet of curved coated float glass was bonded to a sheet of polyurethane to form a glass/plastics laminate. The polyurethane used was 0.6 mm in thickness and was supplied by Bayer. The bonding method used was that of Example 2 of British patent specification No. GB 2 074 090 A.

EXAMPLE 9

In another variant of Example 7, the 4 mm sheet of coated float glass was curved for use as a vehicle rear window. A conductive grid for example of enamel was deposited on the uncoated concave face of the sheet in a manner known per se to serve as a rear window heating element.

We claim:

1. A vehicle window having improved abrasion resistance and frozen condensate removal, comprising a glass sheet bearing a tin oxide coating which is located on an external face of the vehicle window and which has a polished tin oxide surface provided thereon by polishing the tin oxide coating after deposition thereof.

2. The vehicle window according to claim 1, wherein the tin oxide coating has a thickness ranging from 320 nm to 850 nm.

3. The vehicle window according to claim 2, wherein the thickness of the tin oxide coating ranges from 700 nm to 800 nm.

4. The vehicle window according to claim 1, wherein the tin oxide coating reduces the emissivity of the external face which bears the tin oxide coating in respect of infra-red radiation having wavelengths greater than 3 micrometers.

5. The vehicle window according to claim 4, wherein the external face which bears the tin oxide coating has an emissivity of not more than 0.3.

6. The vehicle window according to claim 5, wherein the emissivity of the external face which bears the tin oxide coating does not exceed 0.2.

7. The vehicle window according to claim 1, which has a luminous transmission of at least 70%.

8. The vehicle window according to claim 1, which further comprises at least one further sheet to which the glass sheet bearing a tin oxide coating is bonded via its non-coated face to form a transparent laminate having the tin oxide coating on an external face thereof.

9. The vehicle window according to claim 1, which is curved, which has one concave face and one convex face, and which has the tin oxide coating provided on the convex face.

10. The vehicle window according to claim 1, which is installed in a vehicle with the external face thereof which bears the tin oxide coating directed outwardly.

11. A vehicle window having improved abrasion resistance and frozen condensate removal, comprising a glass sheet bearing a tin oxide coating which has a thickness ranging from 320 nm to 850 nm, which is located on an external face of the vehicle window, and which has a polished tin oxide surface provided thereon.

12. A vehicle window having improved abrasion resistance and frozen condensate removal, comprising a glass sheet bearing a tin oxide coating which has a polished tin oxide surface provided thereon, an emissivity of not more than 0.2, a thickness ranging from 320 nm to 850 nm, and which is located on an external face of the vehicle window.

13. A vehicle window having improved abrasion resistance and frozen condensate removal, comprising a glass sheet bearing a tin oxide coating which has a polished tin oxide surface provided thereon, which is located on an external face of the vehicle window, and which is prepared by a process comprising:
   a. depositing a tin oxide coating on a face of a piece of glass in sheet or ribbon form; and
   b. subjecting the tin oxide coating to a polishing treatment.

14. A vehicle window according to claim 13, wherein the tin oxide coating after step b. has a thickness ranging from 320 to 850 nm.

15. A vehicle window according to claim 13, wherein the external face which bears the tin oxide coating has an emissivity of not more than 0.2.

16. A vehicle equipped with at least one vehicle window according to claim 1.

* * * * *